Feb. 7, 1928.
E. C. RENAUD
1,658,302
VEHICLE
Filed Dec. 17, 1926  2 Sheets-Sheet 1
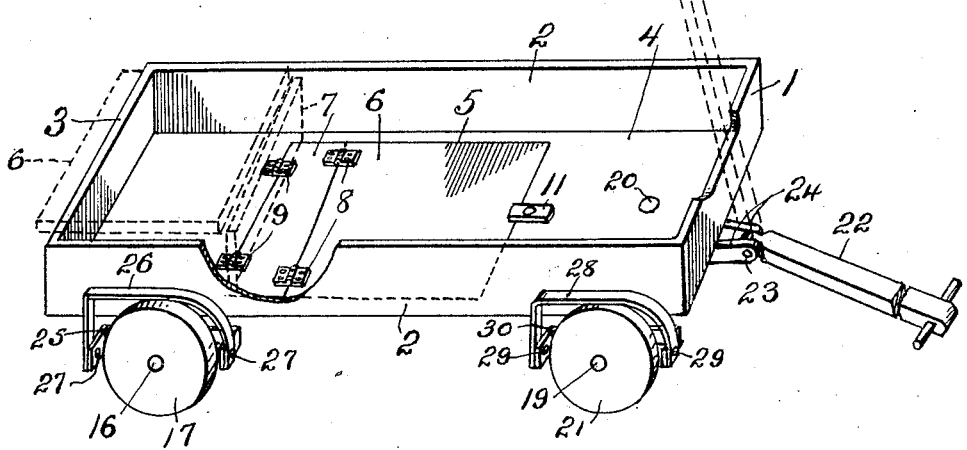
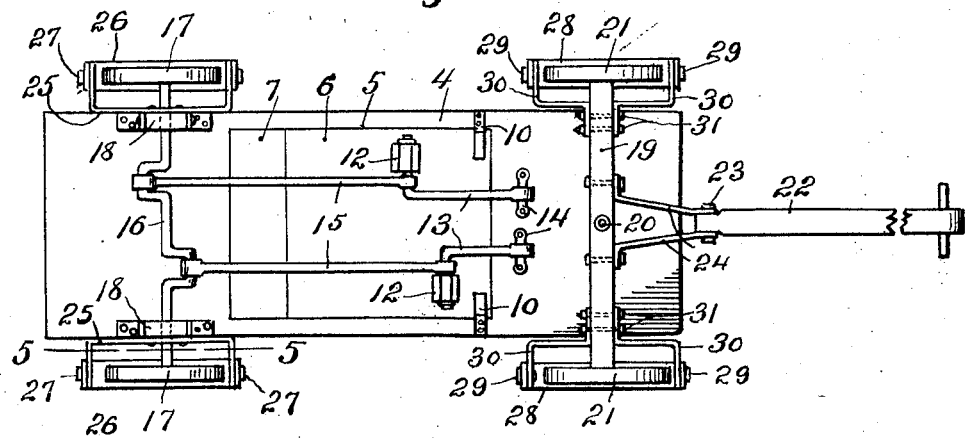
INVENTOR.
Edwin C. Renaud
BY Warren D. House
His ATTORNEY.
witness:
R. E. Hamilton Feb. 7, 1928.
E. C. RENAUD
1,658,302
VEHICLE
Filed Dec. 17, 1926
2 Sheets-Sheet 2
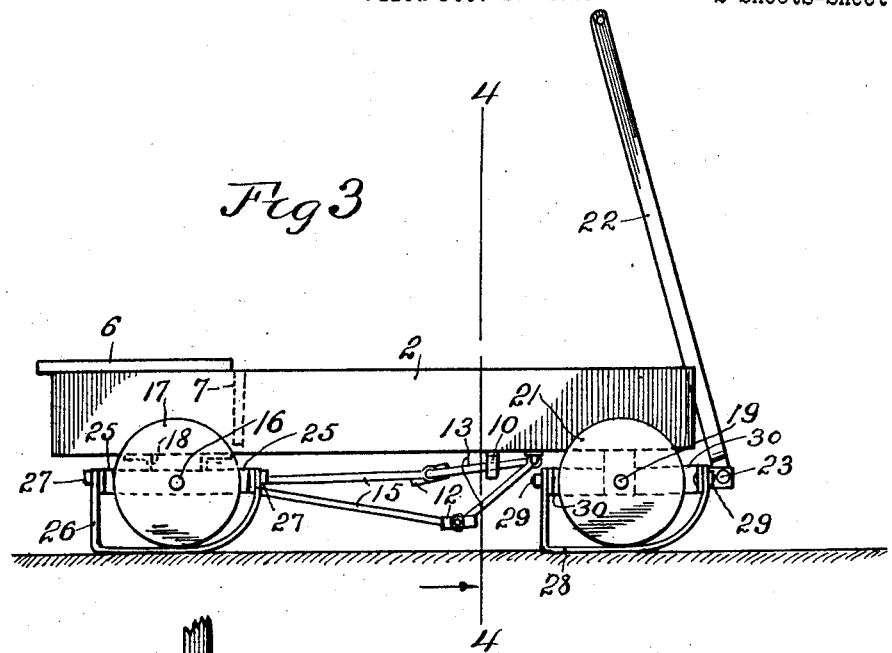
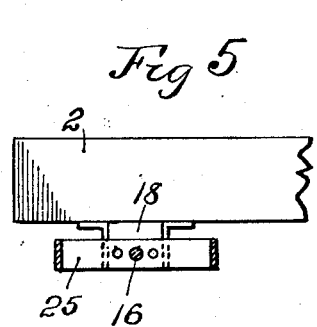
INVENTOR.
Edwin C. Renaud
BY
Warren D. House,
His ATTORNEY.
Witness:
R. E. Hamilton Patented Feb. 7, 1928.

1,658,302

UNITED STATES PATENT OFFICE.

EDWIN C. RENAUD, OF ST. JOSEPH, MISSOURI.

VEHICLE.

Application filed December 17, 1926. Serial No. 155,412.

My invention relates to improvements in vehicles.

It is particularly well adapted for use in connection with toy vehicles, but has the features adapting it for use on vehicles irrespective of their size or purpose.

One of the objects of my invention is to provide a novel vehicle of the kind described, which can be used as a wagon for the transportation of an occupant or other objects placed therein, which may be used as a toy automobile, a coaster or a sled, which can be propelled by hand or foot power or by its own momentum down inclined surfaces and over the ground, or on snow or ice.

A further object of my invention, is the provision, in a vehicle of the kind described, of novel means by which sled runners with which it is provided may be disposed so as to perform the functions of sled runners, or to serve as fenders or mud guards over the wheels of the vehicle, when the wheels are employed to support the vehicle.

A further object of my invention is to provide a vehicle of the kind described with a bed having an aperture in the floor through which the legs of the occupant may be extended, a closure for said aperture, and a foot support arranged to also perform the function of supporting said closure in its closed position.

A further object of my invention is to provide a vehicle of the kind described, which is simple, cheap to make, durable, strong and not liable to get out of order, and with which the vehicle may be quickly and easily converted to the different types mentioned without addition to or removal of parts of the same, thereby avoiding complicated manipulation and liability of losing necessary parts.

The novel features of my invention are hereinafter fully described and claimed.

In the accompanying drawings, which illustrate the preferred embodiment of my invention, Fig. 1 is a perspective view, partly broken away, of my improved vehicle shown supported by the wheels thereof with the runners disposed over the wheels to serve as fenders or mud guards.

Fig. 2 is a bottom view of the same.

Fig. 3 is a side elevation of my improved vehicle showing the runners in positions in which they support the vehicle so that the latter may be used as a sled.

Fig. 4 is a cross section, partly broken away, on the line 44 of Fig. 3.

Fig. 5 is a section on the line 55 of Fig. 2.

Similar references designate similar parts in the different views.

The bed of the vehicle is provided with a front board 1, side boards 2, a tail board 3 and a floor 4.

The floor 4 is provided with a large substantial central aperture 5, which is adapted to be closed by a cover, which may consist of movable front and rear floor segments 6 and 7, which are hinged to each other by hinges 8, the rear edge of the segment 7 being connected to the stationary part of the floor at the rear end of the aperture 5 by hinges 9, Fig. 1.

For supporting the floor segment 6 in the closed position, shown in Fig. 2 and in solid lines in Fig. 1, I provide two Z-shaped brackets 10, which are secured to the under side of the floor 4 and extend respectively below the aperture 5 at opposite sides thereof. The inner ends of the brackets 10 are preferably depressed, as shown in Fig. 4, to serve as foot rests upon which the feet of the operator may be supported, when the vehicle is used for coasting.

Pivoted on the upper side of the floor 4, is a turnbutton 11, which is adapted to be swung to and from the position shown in Fig. 1, in which position it extends over the floor segment 6, so as to hold the latter from upward swinging.

When the turnbutton 11 is swung to a position at right angles from that shown in Fig. 1, the floor segment 7 may be swung upwardly to a vertical position, and the floor segment 6 swung thereon rearwardly to a horizontal position in which it will project rearwardly beyond and will rest upon the upper edge of the tail board 3, as shown in dotted lines in Fig. 1.

In the last named position floor segments 6 and 7 may be used as a seat for the operator, who may extend his legs through the aperture 5 and have his feet supported on the brackets 10 or resting upon two pedals 12, which are respectively mounted upon two pedal levers 13, the forward ends of which are respectively pivoted to two plates 14 fastened to the under side of the floor 4.

The pedal levers 13 are respectively connected by two rods 15 to two cranks of a rear axle 16, in the manner generally employed in foot propelled toy automobiles.

The axle 16 has affixed thereto two rear wheels 17, which serve as driving wheels.

The axle 16 is rotatably mounted in two bearings 18, mounted on the under side of the floor 4.

The front axle 19 is pivoted by a king bolt 20, in the usual manner, to the under side of the floor 4. It has rotatably mounted on it front carrying wheels 21.

A tongue 22 is pivotally connected at its rear end by a horizontal bolt 23 to two forwardly extending plates 24, the rear ends of which are fastened to the forward side of the axle 19.

Two horizontal U-shaped brackets 25 have their transverse portions respectively fastened to the outer side of the bearings 18, Fig. 2. Two substantially U-shaped rear sled runners 26 have their arms respectively pivoted by horizontal bolts 27 to the arms of the brackets 25, in such a manner that the runners 26 may be swung on the bolts 27 to the positions shown in Figs. 3 and 4, in which positions the runners will have their transverse portions resting on the ground, snow or ice, as the case may be, with the rear wheels 17 adapted to have a bearing on the upper sides of the runners 26 respectively. The bolts 27 are disposed a little above the horizontal plane of the axial center of the axle 16 and substantially in the central longitudinal vertical planes of the wheels 17, whereby the runners 26 may be swung on the bolts 27 from the sled runner position, shown in Figs. 3 and 4, to positions over the wheels 17, in which positions, the runners will be spaced from the wheels 17, and will serve as fenders or mud guards therefor, as shown in Figs. 1 and 2.

Two front sled runners 28, corresponding in form and function to the rear sled runners 26 have their arms respectively pivoted by horizontal bolts 29 to the outer ends of two pairs of horizontal Z-shaped brackets 30, the inner ends of which are fastened by horizontal bolts 31 to the front and rear sides of the front axle 19, Fig. 2.

As is the case with the bolts 27, the bolts 29 are disposed slightly above the horizontal plane of the axial center of the adjacent axle 19, whereby the front sled runners 28 may be swung on the bolts 29 to the sled runner position in which they will rest on the ground, ice or snow, under the wheels 21, as shown in Figs. 3 and 4, or they may be swung to position above and spaced from the wheels 21, as shown in Figs. 1 and 2, so as to serve as fenders or mud guards therefor.

When it is desired to use the vehicle as a wagon to be drawn by the tongue 22, the runners 26 and 28 are swung to the fender position over the wheels, as shown in Figs. 1 and 2, and the floor segments 6 and 7 may be disposed in the closed position shown in Fig. 2 and in solid lines in Fig. 1.

When it is desired to use the vehicle as a sled, the runners 26 and 28 are swung to the sled runner position shown in Figs. 3 and 4.

When it is desired to use the vehicle as an automobile, the runners 26 and 28 are swung to the fender position, shown in Figs. 1 and 2, and the floor segments 6 and 7 are swung to the seat position shown in dotted lines in Fig. 1, and in solid and dotted lines in Fig. 3.

The operator may then sit on the floor segment 6 with his legs extending through the aperture 5 and his feet resting upon and adapted to actuate the pedals 12 for rotating the axle 16 in the usual manner, as is well understood. The tongue 22 may be swung to the upwardly and rearwardly inclined position shown in Fig. 3 and in dotted lines in Fig. 1, in which position the operator may use it to steer the vehicle.

If the operator desires to coast he will remove his feet from the pedals 12 and support them on the foot rests 10. In like manner the operator may steer the vehicle by means of the tongue 22, when the parts are disposed as shown in Fig. 3 and the vehicle is used as a sled for coasting.

I do not limit my invention to the structure shown and described, as many modifications, within the scope of the appended claims, may be made without departing from the spirit of my invention.

What I claim is.

1. In a vehicle of the kind described, the combination with an axle and a wheel mounted thereon and adapted to support the axle, of a sled runner, and means supported by the axle and engaging said runner by which the latter may be moved to a position in which it is adapted to support the vehicle, or moved to a position above and serving as a mud guard for said wheel, when the latter is used as a support for the vehicle.

2. In a vehicle of the kind described, the combination with an axle, and a carrying wheel mounted thereon and adapted to support the axle, of a sled runner, and means mounted on the axle and pivotally connected to said runner, the latter being adapted to be swung from a carrying position supporting the vehicle to a position over and serving as a fender or mud guard for said wheel, when the latter is supporting the vehicle.

3. In a vehicle of the kind described, the combination with a carrying wheel, of a sled runner, and means by which the sled runner may be moved to a vehicle supporting position or to a position over and made to serve as a fender or mud guard for said wheel when the latter supports the load.

4. In a vehicle of the kind described, the combination with a carrying wheel, of a sled runner, and means pivotally supporting said runner by which it may be swung to a vehicle carrying position or to a position over said wheel so as to serve as a fender or mud guard for the wheel when the latter supports the vehicle.

5. In a vehicle of the kind described, the combination with a front pivoted axle and a carrying wheel mounted thereon, of supporting means carried by the axle, and a sled runner movable on said supporting means to and from a position in which it will support the axle and arranged, when in the supporting position, to turn with the axle, when the latter is turned on its axis.

6. In a vehicle of the kind described, the combination with a front pivoted axle and a carrying wheel mounted thereon, of supporting means carried by the axle, and a sled runner movable on said supporting means from a position in which it will support the axle to a position over and in which it will serve as a fender or mud guard for said wheel when the latter supports the axle.

7. In a vehicle of the kind described, the combination with a carrying wheel, of a sled runner, and means by which the sled runner may be moved to a vehicle supporting position, in which position, said wheel will have a bearing thereon, or to a position over said wheel so as to serve as a fender or mud guard therefor, when the wheel supports said vehicle.

In testimony whereof I have signed my name to this specification.

EDWIN C. RENAUD.